United States Patent [19]

Fenne

[11] 4,153,200

[45] May 8, 1979

[54] FUEL INJECTION NOZZLES

[75] Inventor: Ivor Fenne, Greenford, England

[73] Assignee: Lucas Industries Limited, Birmingham, England

[21] Appl. No.: 850,451

[22] Filed: Nov. 10, 1977

[30] Foreign Application Priority Data

Nov. 12, 1976 [GB] United Kingdom ............... 47188/76

[51] Int. Cl.[2] .............................................. F16K 17/04

[52] U.S. Cl. .................................... 239/94; 239/533.7

[58] Field of Search ......................... 239/533.3-533.12, 239/453, 94

[56] References Cited

U.S. PATENT DOCUMENTS

| | | | |
|---|---|---|---|
| 2,107,891 | 2/1938 | Gillen | 239/453 |
| 3,727,636 | 4/1973 | Simmons | 239/453 X |
| 4,082,224 | 4/1978 | Mangus | 239/533.12 X |

FOREIGN PATENT DOCUMENTS

| | | | |
|---|---|---|---|
| 278720 | 10/1951 | Switzerland | 239/533.7 |

*Primary Examiner*—Robert W. Saifer

[57] ABSTRACT

A fuel injection nozzle comprises a poppet valve member having a head which is adapted to co-operate with a seating to control the flow of fuel through a spray orifice from an inlet. The poppet valve defines a first surface against which fuel under pressure can act from the inlet to lift the poppet valve from its seating and the orifice is formed in the valve member below the head so that when the poppet valve is closed the orifice is closed off from the combustion space of the engine. A second surface of annular form and facing into an annular chamber is provided to surround the poppet valve member and in communication with the inlet by way of a non-return valve, the pressure acting on the second surface to oppose the lifting of the head from the seat of the poppet valve.

6 Claims, 1 Drawing Figure

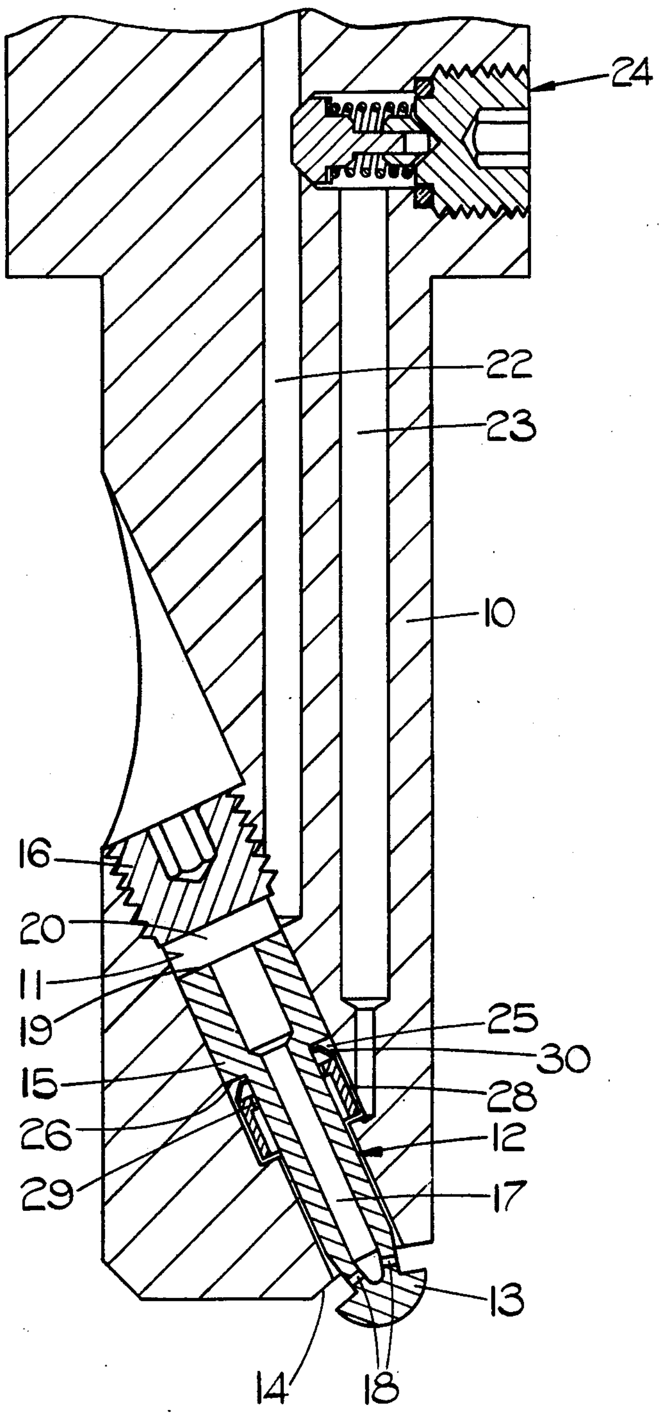
24
22
23
10
16
20
11
19
25
30
15
28
26
12
29
17
13
14
18

FUEL INJECTION NOZZLES

This invention relates to a fuel injection nozzle for supplying fuel to a combustion chamber of an internal combustion engine.

According to the present invention, there is provided a fuel injection nozzle comprising a poppet valve member having a head which is adapted to co-operate with a seating to control the flow of fuel through a spray orifice from an inlet, said poppet valve member having a surface against which fuel under pressure from said inlet acts to lift said poppet valve member off said seating and thereby permit the flow of fuel through said orifice from said inlet, the spray orifice being positioned beneath the head of the valve member so that when the valve member is closed, the orifice is closed off from the combustion space of the engine.

One example of a fuel injection nozzle in accordance with the present invention will now be described with reference to the accompanying drawing, which is a sectional side view of a fuel injection nozzle for a compression ignition engine.

The fuel injection nozzle comprises an elongate body 10 through which a stepped bore 11 extends, the axis of the bore 11 being inclined at an acute angle to the longitudinal axis of the body 10. The bore 11 is thus inclined to enable off-set injection to be performed, the angle of inclination being approximately equal to the degree of off-set required.

Located in the bore 11 is a poppet valve member 12 which is stepped in a corresponding manner to the bore 11. The valve member 12 includes a head 13 which is adapted to engage sealingly a seating 14 on a part of the exterior of the body 10, which faces into a combustion chamber (not shown) of the engine and a stem 15 connected to the head 13. The head 13 projects from the narrower end of the bore 11, the wider end of the latter being closed by a plug 16. A passage 17 extends through the stem 15 and communicates at one end thereof with spray orifices 18 adjacent but below the head 13. The other end of the passage 17 opens onto a first surface 19 at an end of the valve member 12 remote from the head 13, the first surface 19 facing the plug 16 and being spaced therefrom so as to define a cylindrical chamber 20 therebetween. The chamber 20 communicates with an inlet (not shown) via a conduit 22 in the body 10 the inlet being connected in use to the outlet from a fuel supply pump (also not shown). A further conduit 23 in the body 10 communicates at one end thereof with the conduit 22 via a non-return valve 24, which allows fuel to flow into a conduit 23 from conduit 22 and at the other end thereof with an annular chamber 25 defined between the step in the valve member 12 and the step in the bore 11. The step in the valve member 12 in fact defines a second, annular surface 26 against which fuel under pressure in the chamber 25 can act.

Disposed in the chamber 25 is an annular piston 28. A radially outer surface of the piston 28 is a lapped fit with the outer cylindrical wall of the chamber 25 (defined by a side wall of the bore 11). A small clearance 29 is provided between a radially inner surface of the piston 28 and the inner cylindrical wall of the chamber 25 (defined by the stem 15 of the valve member 12), which clearance 29 acts as a restrictor in a manner to be described. A spring washer 30 is disposed in the space between the piston 28 and the step in the valve member 12, and biases the piston 28 away from the second surface 26 into engagement with the step in the bore 11, which thereby acts as a fixed stop for the piston 28. Below the clearance 29 the inner periphery of the piston 28 is cut away so as to allow communication between the space in which the spring washer 30 is located and the conduit 23 via the clearance 29.

In use, fuel under pressure is supplied to the chamber 20 from the aforementioned supply pump via the conduit 22, and this fuel acts against the first surface 19 of the valve member 12. The non-return valve 24 permits fuel under pressure to flow into chamber 25 via conduit 23, which fuel acts against the second surface 26 of the valve member 12 so as to oppose lifting of the valve member 12 off the seating 14. The areas of the surfaces 19 and 26 are so arranged that the pressure of the fuel acting on surface 19 can lift the valve member 12 off the seating 14 against the pressure of the fuel acting on surface 26, the pressure in the combustion chamber, and the pressure exerted by the spring washer 30. When the valve member 12 has been so lifted, fuel can flow into the combustion chamber via the passage 17 and the spray orifices 18. The orifices are disposed so that when the valve member is open there will be the minimum disturbance of the fuel spray by the head of the valve member and the adjacent seating.

The speed at which the valve member 12 is lifted off the seating 14 is restricted by the piston 28. When lifting of valve member 12 commences, the piston 28 is engaged with the step in the bore 11, and the valve member 12 moves so as to decrease the volume of the space between the second surface 26 and the piston 28, thus compressing the spring washer 30. Fuel can flow from this space into the conduit 23 only at a rate determined by the restrictor formed by the clearance 29, and the speed at which the injection nozzle opens is correspondingly restricted thereby. This provides a controlled initial rate of injection. Upon termination of injection, fuel in the chamber 20 and the conduit 22 is depressurised, and the valve member 12 is biased back into engagement with the seating 14. Flow of fuel into the space between the second surface 26 and the piston 28 is restricted by the restrictor formed by the clearance 29. Consequently, the volume of this space cannot be expanded quickly, and the piston 28 moves with the valve member 12 away from the step in the bore 11. Thus, the piston 28 has no effect on the speed at which the valve member 12 moves back onto the seating 14. Before the next injection commences, fuel flowing through the clearance 29 allows the spring washer 30 to move the piston 28 back into engagement with the step in the bore 11.

If from one injection to the next, the peak pressure of the fuel being supplied from the supply pump increases, for example due to an increase in the speed of the engine, or an increase in the amount of fuel supplied, the non-return valve, 24 will open to allow the fuel in conduit 23 and chamber 25 to be brought up to the peak pressure of the fuel in conduit 22. If on the other hand the peak pressure decreases from one injection to the next, leakage of fuel between the valve member 12 and the sides of the bore 11 will allow the fuel pressure in conduit 23 and chamber 25 to fall. Thus, the pressure of the fuel in conduit 23 and chamber 25 will vary in dependence upon changes in the pressure of the fuel being supplied from the supply pump, and therefore the pressure at which the fuel acting on surface 19 opens the injection nozzle will vary in dependence upon changes in the speed and load of the engine.

The fact that the spray orifice is disposed below the head of the valve means that when the valve member is in the closed position the orifice is closed off from the combustion chamber and fuel cannot therefore dribble into the combustion chamber as can occur in the more usual form of injection nozzle where the orifices are on the periphery of the nozzle and the valve member and seating are upstream of the orifices.

I claim:

1. A fuel injection nozzle for supplying fuel to a combustion chamber of an internal combustion engine, comprising a poppet valve member having a head which is adapted to co-operate with a seating to control the flow of fuel through a spray orifice from an inlet, said poppet valve member having a first surface against which fuel under pressure from said inlet acts to lift said poppet valve member off said seating and thereby permit the flow of fuel through said orifice from said inlet, the spray orifice being positioned beneath the head of the valve member so that when the valve member is closed, the orifice is closed off from the combustion space of the engine, said first surface being defined by the end of a stem forming part of the poppet valve member, a passage extending through said stem and opening onto said first surface, said orifice being provided in the stem below said head, and communicating with said passage, and a second surface which is of annular form and faces into an annular chamber which surrounds the poppet valve member and which communicates with said inlet by way of a non-return valve, the pressure acting on said surface acting to oppose the lifting of the head from the seat.

2. A nozzle according to claim 1 including means for restricting the speed at which the poppet valve member is lifted off the seating.

3. A nozzle according to claim 2 in which said means includes a flow restrictor through which fuel displaced by movement of said further surface flows when the valve member is lifted from the seating.

4. A nozzle according to claim 3 including an annular piston disposed in said annular chamber and surrounding the stem of the poppet valve member, and biasing means for biasing the piston away from said further surface towards a fixed stop.

5. A nozzle according to claim 4 in which the biasing means acts between said further surface and the piston.

6. A nozzle according to claim 5 in which said chamber has a pair of substantially co-axial cylindrical walls and said piston is in sliding engagement with one of said walls, said flow restrictor being defined by a clearance between the piston and the other of said walls.

* * * * *